United States Patent
Aaltonen et al.

(10) Patent No.: US 8,195,547 B2
(45) Date of Patent: *Jun. 5, 2012

(54) METHOD AND SYSTEM FOR PAYMENT AND/OR ISSUANCE OF CREDITS VIA A MOBILE DEVICE

(75) Inventors: Janne Aaltonen, Turku (FI); Sami Saru, Turku (FI)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/071,676

(22) Filed: Mar. 25, 2011

(65) Prior Publication Data

US 2011/0173053 A1    Jul. 14, 2011

Related U.S. Application Data

(62) Division of application No. 12/157,099, filed on Jun. 6, 2008, now Pat. No. 7,933,799.

(60) Provisional application No. 60/934,227, filed on Jun. 12, 2007.

(30) Foreign Application Priority Data

Feb. 26, 2008   (GB) .................................. 0803468.8

(51) Int. Cl.
   *G06Q 40/00*   (2006.01)
(52) U.S. Cl. ........................................... 705/35; 705/14
(58) Field of Classification Search .................... 705/14, 705/35–39
See application file for complete search history.

(56) References Cited

U.S. PATENT DOCUMENTS

| | | | |
|---|---|---|---|
| 6,250,557 B1 | 6/2001 | Forslund et al. | |
| 6,408,309 B1 | 6/2002 | Agarwal | |
| 6,826,542 B1 * | 11/2004 | Virgin et al. | 705/34 |
| 7,933,799 B2 * | 4/2011 | Aaltonen et al. | 705/35 |
| 8,073,774 B2 * | 12/2011 | Pousti | 705/40 |
| 2002/0006803 A1 | 1/2002 | Mendiola et al. | |
| 2002/0019829 A1 | 2/2002 | Shapiro | |
| 2002/0075305 A1 | 6/2002 | Beaton et al. | |
| 2003/0126015 A1 | 7/2003 | Chan et al. | |
| 2004/0209649 A1 | 10/2004 | Lord | |

(Continued)

FOREIGN PATENT DOCUMENTS

BE       1015704       7/2005

(Continued)

OTHER PUBLICATIONS

U.K. Search Report under Section 17 dated Jun. 4, 2008 in U.K. Application No. GB0803468.8.

(Continued)

*Primary Examiner* — Thu Thao Havan
(74) *Attorney, Agent, or Firm* — Novak Druce + Quigg LLP

(57) ABSTRACT

System and method for delivering upon request credits having monetary value to a mobile device using a communications network. An account of available credit for the user of the mobile device is maintained and authorization to issue credit is generated when a request for credit for the mobile device is received and there is available credit in the account associated with the mobile device equal to or greater than the requested credit. Credit may be sponsored by one or more sponsors and issued to the user, upon authorization, to enable the user to use the mobile device to purchase items, e.g., at a point of sale terminal.

29 Claims, 2 Drawing Sheets

U.S. PATENT DOCUMENTS

| | | |
|---|---|---|
| 2005/0222949 A1 | 10/2005 | Inotay et al. |
| 2005/0228680 A1 | 10/2005 | Malik |
| 2005/0239504 A1 | 10/2005 | Ishii et al. |
| 2005/0273465 A1 | 12/2005 | Kimura |
| 2006/0048059 A1 | 3/2006 | Etkin |
| 2006/0068845 A1 | 3/2006 | Muller et al. |
| 2006/0117378 A1 | 6/2006 | Tam et al. |
| 2008/0057917 A1 | 3/2008 | Oria |

FOREIGN PATENT DOCUMENTS

| | | |
|---|---|---|
| EP | 1 280 087 A1 | 1/2003 |
| EP | 1 320 214 A1 | 6/2003 |
| EP | 1 528 827 A2 | 5/2005 |
| EP | 1 772 822 A1 | 4/2007 |
| GB | 2 372 867 A | 9/2002 |
| WO | WO 01/44977 A2 | 6/2001 |
| WO | WO 01/63423 A1 | 8/2001 |
| WO | WO 02/44989 A2 | 6/2002 |
| WO | WO 02/096056 A2 | 11/2002 |
| WO | WO 2004/100470 A1 | 11/2004 |
| WO | WO 2005/073863 A1 | 8/2005 |
| WO | WO 2006/024003 A1 | 3/2006 |
| WO | WO 2007/002025 A2 | 1/2007 |
| WO | WO 2007/060451 A1 | 5/2007 |
| WO | WO 2007/091089 A1 | 8/2007 |

OTHER PUBLICATIONS

International Search Report (Form PCT/ISA/210) mailed Jan. 22, 2009 in related International Application No. PCT/EP2008/057438.

Written Opinion of the International Searching Authority (Form PCT/ISA/237) dated Jan. 22, 2009 in related International Application No. PCT/EP2008/057438.

Notification Concerning Transmittal of International Preliminary Report on Patentability (Chapter 1 of the Patent Cooperation Treaty) mailed Dec. 30, 2009 in related International Application PCT/EP2008/057438 (1 page).

International Preliminary Report on Patentability mailed Dec. 30, 2009 in related International Application PCT/EP2008/057438 (1 page).

Written Opinion of the International Searching Authority mailed Dec. 30, 2009 in related International Application PCT/EP2008/057438 (5 pages).

* cited by examiner

METHOD AND SYSTEM FOR PAYMENT AND/OR ISSUANCE OF CREDITS VIA A MOBILE DEVICE

CROSS-REFERENCE TO RELATED APPLICATIONS

This is a continuation of U.S. patent application Ser. No. 12/157,099 filed Jun. 6, 2008, which claims priority from UK Application GB 0803468.8 filed Feb. 26, 2008 and from U.S. Provisional Patent Application No. 60/934,227 filed Jun. 12, 2007, the entire contents of each of which is incorporated herein by reference.

FIELD OF THE INVENTION

The present invention relates generally to methods and systems for payment of goods and services, and the issuance of credits toward the payment of goods and services, via a mobile device.

BACKGROUND OF THE INVENTION

Usage of cellular or mobile telephones is very popular and common. In a typical arrangement for use of a mobile telephone, a user subscribes to a mobile telephone service offered by a mobile telephone operator or carrier and enters into a pre-paid or post-paid plan with the mobile telephone operator. A pre-paid subscription plan is usually an arrangement where the user pays in advance for the telephone services to be used over a future period of time. A post-paid subscription plan is usually an arrangement where the user pays for the telephone services after using the services.

The services available using the mobile telephone may be voice services (i.e., making and receiving telephone calls), messaging services such as Short Message Service (SMS), Multimedia Message Service (MMS), data services such as Internet browsing or Wireless Application Protocol (WAP) browsing, video calls, downloading content, streaming content, purchasing applications such as games or other software, using location, guidance or navigation services, finding information, and communicating with a group of people and others.

Mobile telephones can also be used as a payment method in point of sales transactions. One example of such usage involves use of the near field communication (NFC) capabilities of a mobile telephone to use it as credit card in the point of sales transaction.

On the other hand, instead of being used to pay for goods and services, a mobile telephone can receive coupons for discounts which may be used in a point of sales transactions conducted using the mobile telephone or otherwise, and free samples which may be received using the mobile telephone or otherwise. In this regard, reference is made to International Publication No. WO 2007/060451, incorporated by reference herein in its entirety.

SUMMARY OF THE INVENTION

The present invention is directed at least in part to a method and system for providing credits, vouchers or coupons representative of monetary value to users of mobile devices such as mobile telephones. The users of the mobile telephones are able to use the monetary value of the credits to purchase goods and/or services.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
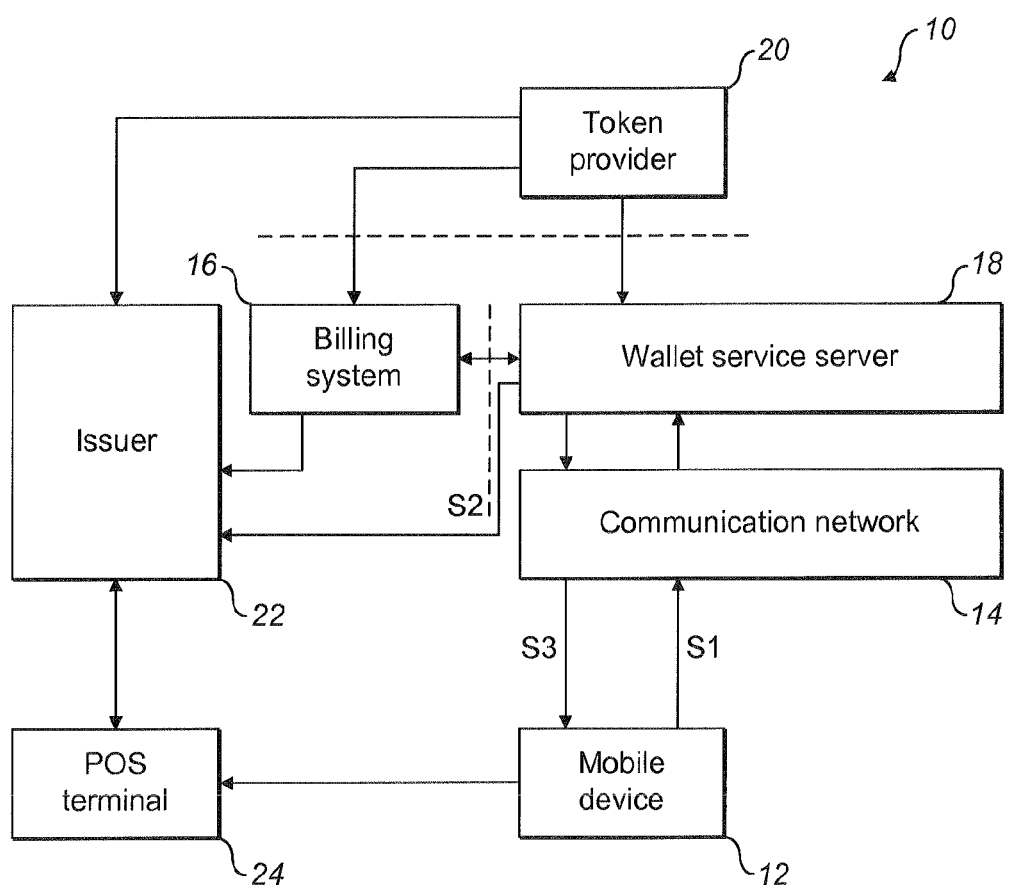
FIG. 1 is a schematic of an exemplifying architecture of a first embodiment of a credit delivery system in accordance with the invention.

Referring to the accompanying drawings wherein the same reference numerals refer to the same or similar elements, FIG. 1 shows an architecture of an embodiment of a mobile payment system in accordance with the invention which is designated generally as 10.

System 10 may be implemented to provide credits having monetary value to mobile devices 12 (only one of which is shown in FIG. 1) and thus can be considered to be independent of the mobile devices 12, i.e., not include the mobile devices. On the other hand, the invention also encompasses a system for enabling users of mobile devices 12 to receive credits having monetary value which would be inclusive of the mobile devices. In the latter case, the users may be required to view advertisements in exchange for the credits.

The mobile devices 12 may be any form of mobile terminal such as a mobile telephone, a multimedia computer, a personal digital assistant (PDA), a laptop computer or a personal computer.

Mobile devices 12 are arranged to use a communications network 14 to communicate with other elements of the system 10 described below. Communications network 14 can utilize any cellular network technologies which include, but are not limited to, GSM, WCDMA, CDMA, GPRS. In addition to traditional cellular networks, local area networks such as Wireless Local area networks (WLAN), BlueTooth (BT) and other technologies such as WiMax, Broadcasting over DVB-H, ISDB-T, DMB or broadcasting over cellular can be used. The communications network 14 can also be a generic Internet access network using any data transport methods. Moreover, the communications network 14 may be any cellular, broadcast, wide area, local area or Internet network. Communications network 14 can also be a combination of different communications networks such as a Wireless Local Area Network (WLAN) and a Wideband Code Division Multiplex (WCDMA) network.

Subscribers to the mobile telephone operator using the mobile devices 12 can use the same communications network or another communications network as the communications network 14 being used to receive credits, i.e., a hybrid network is possible.

In a preferred embodiment, the communications network 14 is a cellular network and the mobile device 12 is a mobile telephone.

System 10 also includes a billing system 16 operatively coupled to the communications network 14 or specific parts thereof, and may be arranged to maintain an account of available money for each mobile device. Further, billing system 16 may be arranged to monitor and/or meter usage of the communications network 14 by each mobile device 14 and monitor and/or meter usage and payments of or for the advertisements being delivered to each mobile device 12. The billing system 16 may be a real-time billing system or a close-toreal-time billing system. The billing system 16 or other suitable means associated with the system 10 can thus arrange for payment from users of the mobile devices 12 based on their usage of the communications network 14. Payment may be pre-paid, i.e. the user has paid for the service before using the communications network and the billing system monitors and reduces the paid amount in the user's account based on usage. Alternatively payment may be post-paid and a billing system monitors usage of the communications network and the user pays for the services after usage. Usage of the communications network 14 may entail voice services, messaging services (Short Message Service, Multimedia Message Service, Instant Message Service, Electronic mail services), video telephony services, push-to-talk services, data services such as Internet or Wireless Application Protocol (WAP) browsing services, content usage (television, radio, video) services, download services, premium SMS (pSMS) service, among others.

In one embodiment of the invention, billing system 16 meters usage of the services by each user and compares the metered usage with a free or subsidized balance allocated to each user. In this manner, although invoices are not sent to the users, the metered usage is compared with business rules associated with the users and the cost for providing the free or subsidized services to the users is invoiced directly or indirectly from advertisers. Other techniques to provide subsidized or free telephone services to the users are also envisioned. For subsidized telephone services, the users may be responsible for a portion of their usage and thus they would be interested in eliminating unnecessary use of such telephone services.

System 10 also includes a wallet service server 18 which in one embodiment, is a computer system running the wallet service, described below. Wallet service server 18 communications with the mobile devices 12 via the communications network 14, and is operatively coupled to the billing system 16.

In conjunction with the system 10, there may be one or more sponsors 20 which sponsor some of the mobile service such as voice or messaging or a sponsor can be an advertiser which, in exchange for sponsoring a portion of the mobile service being provided to users of the mobile devices 12, sends advertisements via communications network 14 to the users' mobile devices (additional details of this feature are described below). A sponsor 20 may also be a party which wants to sponsor some specific payments to users of mobile devices 12. Each sponsor 20 is provided with access via a computer program operating system 10 to the billing system 14 and the wallet service server 18. Billing system 14 would manage the payments from each sponsor for whatever credits or services they have sponsored.

Regardless of the nature of the sponsorship provided by sponsor(s) 20, each sponsor 20 will cause credits or services, or possibly other items of value, to be provided to the users' mobile devices 12. As such, it should be understood that system 10 may be implemented to provide the credits or services arising from sponsorship by sponsor(s) 20 to mobile devices 12 and thus can be considered to be independent of the sponsor(s) 20, i.e., not include the sponsor(s) 20 or the mobile devices 12. On the other hand, the invention also encompasses a system for enabling sponsors to sponsor delivery of credits or services, or possibly other items of values, to users of mobile devices 12 to receive credits or services, and this system would be inclusive of the sponsor(s) 20 and mobile devices 12.

Issuer 22 is a party which can issue vouchers, coupons or mobile credits for the mobile devices 12. The issuer 22 can issue the credits using any of the techniques disclosed in International Publication No. WO 2007/060451, incorporated in its entirety by reference herein. In one such technique, issuer 22 issues a code which is delivered to the mobile device 12, e.g., via the wallet service server 18 and possibly also via the billing system 16. This code, in practice, works as a coupon which can be used in or by a point of sales (POS) terminal 24. The code is used in or by the POS terminal 24 to verify the amount of credit associated with the code. Thus, the POS terminal 24 sends the code to issuer 22 so that issuer 22 can verify and provide a verification message to the POS terminal 24. When a positive verification message is received by the POS terminal 24, the user of the mobile device 12 is granted the value of the issued coupon for consideration by the POS terminal 24

The sponsor(s) 20 is operatively connected to the issuer 22 to enable each sponsor 20 to authorize issuance of credits to the users' mobile devices 12. The issuer 22 is also operatively coupled to the billing system 16 to coordinate payment for the credits, i.e., allocate payments for the credits to the different sponsors 20. The issuer 22 is also operatively coupled to the wallet service server 18 to provide the credits to the mobile devices 12.

There are several ways to use system 10 to enable a user of a mobile device 12 to receive and use an electronically provided credit, which is being considered equivalent to a voucher or coupon. In one embodiment, a user of the mobile device 12 sends a request for a credit having monetary value (message S1 in FIG. 1). The request can be short message service (SMS) message sent over communications network 14 or a Multimedia Message Service (MMS) message. The request can also be a premium SMS message with a specific monetary value sent to a specific number. Further, the request can be, for example, a Web or Wireless Application Protocol (WAP) session between the wallet service server 18 and the mobile device 12. In addition, the request can be generated by a special application running in the mobile device 12. This special application can be, for example, Java, Symbian or, an application running in Subscriber Identity Module. (SIM application). Other forms of requests, and applications for generating such requests are also envisioned.

The message S1 indicating a request for a credit having monetary value is analyzed by the wallet service server 18. The wallet service server 18 communicates with billing system 16, message S2, to determine whether the user of the mobile device 12 which generated the request message S1 has a credit in their account maintained by the billing system 16. The credit in each account can be so called pre-paid credit, i.e., existing and available money, or it can be post-paid credit. For pre-paid credit, the requested amount of money is deducted from the amount in the pre-paid account. For post-paid credit, the requested amount of money will be invoiced later.

In the embodiment described above, the wallet service server 18 communicates with the billing system 16 to ascertain whether the user requesting credit has available credit in their account (pre-paid credit) or the ability to draw on a line of credit (post-paid credit). In an alternative embodiment, the wallet service server 18 communicates with the issuer 22, or even possibly with a third party such as a bank or credit card company (not shown in FIG. 1) to ascertain whether the issuer 22 or third party has an account with pre-paid or post-paid credit for the user of the mobile device 12 requesting credit.

Regardless of which technique is used to ascertain the availability of credit to the user of the mobile device 12 requesting credit, when there is sufficient credit, i.e., in the account maintained by the billing system 16 or by the third party such as a bank or credit card company, this causes a process of generating and delivering a code to be used to confirm the transaction. The code is typically generated by the user 22, as in prior art techniques. In one embodiment of the invention, the code corresponds to the monetary value of the requested credit or the monetary value of the premium SMS sent from the POS terminal 24 to the wallet service server 18. The monetary value can be less then, equal to or more than the requested amount of credit depending on possible transaction fees and also on the existence and nature of possible sponsors 20 of the credit request.

Once generated, the code to be used in the POS terminal 24 is delivered to the mobile device 12 by message S3.

Once the message S3 is received by the mobile device 12, a computer program in the mobile device 12 can enable the user of the mobile device 12 to obtain money or items, tangible or intangible, having monetary value using the POS terminal 24. In one embodiment, message S3 is readable by the user, e.g. by displaying the message to the user as a text message, and the user may use the code by entering the code at the POS terminal using numeric keys at the POS terminal. The POS terminal 24 validates the code from the user 22, for example, using prior art techniques.

Figure 2:
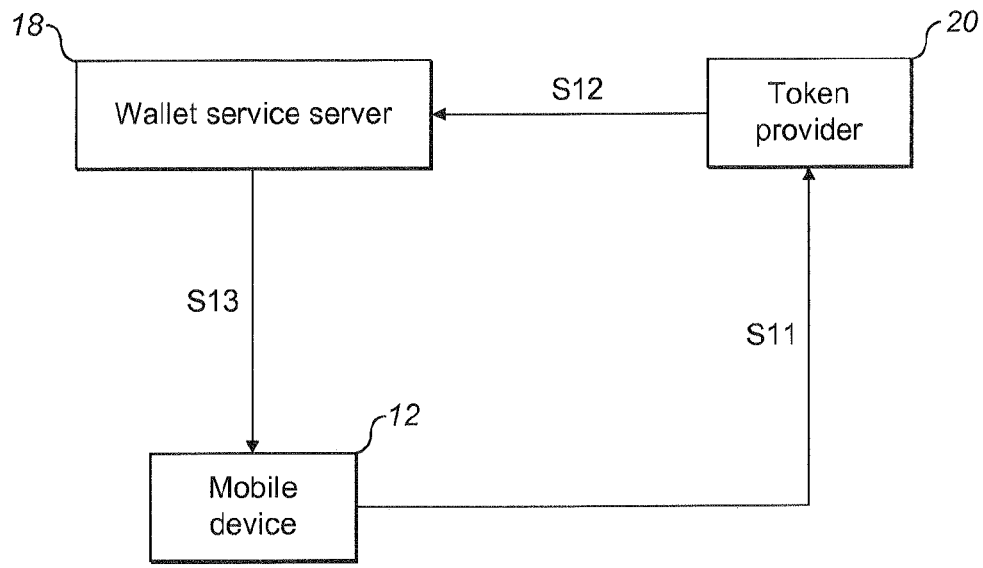
FIG. 2 is a schematic of an exemplifying architecture of a second embodiment of a credit delivery system in accordance with the invention.

In some embodiments of the invention, the sponsor 22 may be another subscriber to the mobile telephone operator, such as a friend or a parent of the user of the mobile device 12. Thus, in the embodiment shown in FIG. 2, a user of mobile device 12 contains a sponsor 20, e.g., his mother, to ask her to give him some money (message S11) in order to, for example, buy an ice cream from a shop. Alternatively, the user of mobile device 12 may ask sponsor 20 to give him an authorization/credit to buy a certain item via message S11. The item sought to be purchased may be identified in message S11 using different means like an ISBN number of a book or as a web link to a web site having information about the item (e.g., a link to a book in the Amazon.com web store), a key word, a bar code, or a bar code number.

Upon receipt of message S11, e.g., by a mobile device of the sponsor 20, a computer program in the mobile device of the sponsor 20 would be arranged to enable the user thereof to connect with wallet service server 18 to grant credit having a certain monetary value or credit for the item for the user of the mobile device 12 (message S12). This may take the form of an authorization to allow a certain amount of credit from an account maintained by the billing system 16 to be used by the user of mobile device 12.

Identification of an item may be implemented such that the user of the mobile device 12 contacts sponsor 20 by sending, for example, a MMS message identifying an item sought to be purchased and disclosing or otherwise providing a bar code of the item (message S11). This bar code information may be then delivered to the wallet service server 18, via message S12, by including a picture received in the message S11 or as a SMS message containing a bar code number.

The connection between a sponsor 20 and the wallet service server 18 may be implemented in several ways, including as a SMS, MMS, using Web/WAP interface, or using a software application installed in the sponsor's mobile device (an application in the mobile device will then manage the connection between the mobile device and the wallet service server 18, e.g., using SMS or a data connection). The wallet service server 18 may then communicate with billing system 16 (as in FIG. 1) to ascertain the availability of credit, as explained above.

After the availability of credit to the user of mobile device 12 requesting such credit is checked and confirmed, the wallet service server 18 notifies the user of mobile device 12 about the available credit (message S13), and the user can then proceed with a purchase as explained above with reference to FIG. 1.

Figure 3:
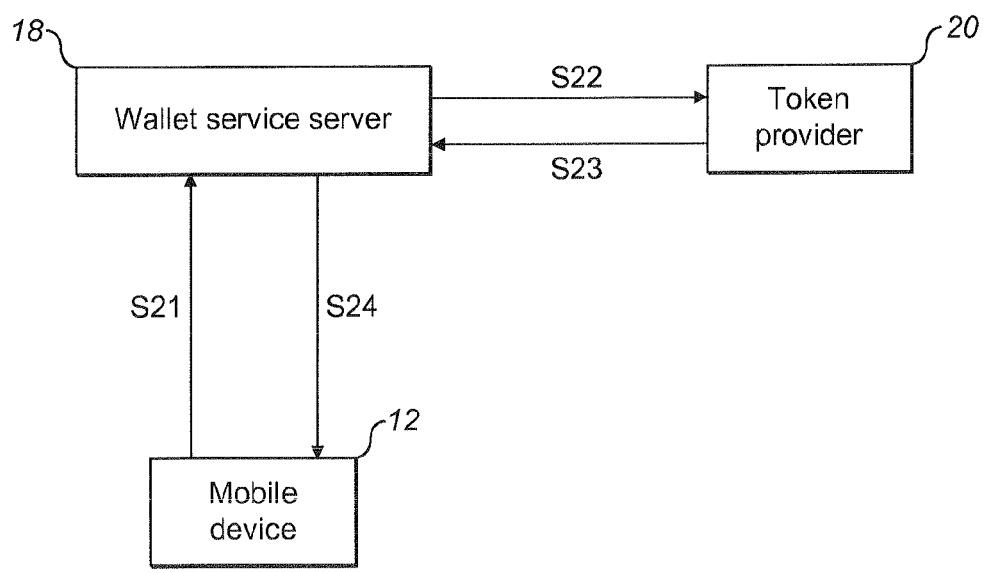
FIG. 3 is a schematic of an exemplifying architecture of a third embodiment of a credit delivery system in accordance with the invention.

As shown in FIG. 3, an embodiment of the present invention also contemplates only indirect communications between the user of the mobile device 12 and a sponsor 20. In this embodiment, the user of the mobile device communicates with the wallet service server 18 to request credit (message S21) and the wallet service server 18 forwards as such or as a modified request to a sponsor identified in the message S21 by the user of the mobile device 12. In some embodiments, it is conceivable that the user does not know for certain whether there will be a sponsor willing to partly or even fully sponsor the requested credit. Wallet service server 22 then communicates with a sponsor 20 advising the sponsor of the user's request for credit and requesting a response as to whether the sponsor 20 is willing to provide some or all of the requested credit (message S22). If sponsor 20 agrees to provide credit, a message S23 is sent by sponsor 20 to the wallet service server 18 which proceeds to issue credit to the user and notify the user of the available credit (message S24), and possibly also notify the user of the identity of the sponsor or sponsors of the credit. The available credit can be used by the user of the mobile device in the manner described above.

In one embodiment, a sponsor 20 may be an entity or individual that wants to advertise products or services to customers participating in a mobile marketing arrangement, or an advertisement management system that is operated by, for example, an advertising delivery company. In exchange for providing credit to a user, the user would be required to be exposed to one or more advertisements.

A sponsor can thus refer to a brand owner, a service provider, an advertisement agent, a merchant or any other party that wants to provide advertisements to consumers. Advertisements can be commercial, such as a product or service promotion, or non-commercial, such as a general information service notification. A sponsor may also be a company in the business of delivering advertisements from several advertisers, i.e., it is the intermediary between advertisers and the operators of advertisement distribution channels. Such a sponsor would create an advertisement management system, which could be over an Internet interface, and includes tools for each advertiser to define rules of their advertisement campaign, i.e., to enable them to tailor the advertisement campaign to their specific desires. This may include reserving, programming and/or booking an advertising campaign via an Internet interface. Parameters which are determined include, but are not limited to, the time period or periods when to send advertisements, the duration of the advertising campaign, the target group or groups, demographics of the target group(s), the format or type of advertisement, the target price level or cost per advertisement or for the advertising campaign in its entirety, the sociological background of the target audience, demographics of the target group(s) including, for example, age, sex and income level(s), target telephone type, etc. In addition to determining the rules, each advertiser typically provides one or more actual advertisements in the form of data, text, pictures, video, audio, html-documents, links, television content, videos, HTML, xHTML, WAP pages, web pages, etc., or any digital content compatible for reception and display by the users' mobile devices 12.

The server including or interfacing with the billing system 16, wallet service server 18 and issuer 22 may also include a database containing information such as profiles of the users of the mobile devices 12. Alternatively, the wallet service server 18 includes such a database. In this manner, each sponsor could be provided with data about each user requesting credit (in the message from the wallet service server 18 to the sponsor 20), determine which user or users they want to receive their advertisements as per their advertising campaign, and authorize credit only for the user or users. An advertisement-supported system for providing credit to users of mobile devices is therefore provided.

Several computer programs resident on computer-readable media may be used in the invention. One computer program is resident in a server which controls or functions as the billing system 16, wallet service server 18 and issuer 22, and interfaces with the mobile device 12 via the communications network 14 and with the sponsor 20, e.g., also via a communications network. This computer program enables users of mobile devices to request and receive credit, possibly from one or more sponsors. In this regard, the designation of elements as a billing system 16, wallet service server 18 and issuer 22 are for ease of explanation of the invention and it is envisioned that all of these elements can be combined in a single electronic component.

In the context of this document, computer-readable medium could be any means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

One embodiment of a computer program in accordance with the invention which delivers upon request credits having monetary value to a mobile device using a communications network is arranged to maintain an account of available credit for the user of the mobile device (a function of the billing system 16), receive a request for credit from the mobile device 12, ascertain whether there is available credit in the account associated with the mobile device equal to or greater than the requested credit (a function of the wallet service server 18), generate an authorization to issue credit when there is available credit in the account (a function of the wallet service server 18), issue credit in response to the authorization (a function of the issuer 22), and notify the user of the mobile device via the communications network of the issuance of credit (a function of the wallet service server 18).

The same or a different computer program can maintain and manage both pre-paid credit accounts which have an available balance and post-paid credit accounts which require later payment. The computer program manages the pre-paid account such that the account is reduced by each amount of authorized credit.

The same or a different computer program can also enable one or more sponsors to provide available credit into the account of each user of a mobile device, and also manage payments from each sponsor for credits they have provided.

The same or a different computer program can also issue a code indicative of the issuance of a specific amount of credit and coordinate delivery of the code to the mobile device. As noted above, the code can be used by a point of sale terminal in order to verify the amount of credit associated with the code.

The foregoing enables innovative and focused mobile marketing and advertising. Indeed, the popularity of mobile telephones has enabled their use, along with related infrastructure, as a media for providing mobile marketing, i.e., advertisements to the users of the telephones.

This is important because such a concept is considered by advertisers as the next new channel to directly reach consumers since it utilizes core assets and characteristics of the mobile media, namely, it is personal in that it is directed solely to individual consumers, it is "always on" and can reach the consumers whenever they access their communications devices, it is mobile and naturally forms groups of people who communicate actively with each other. These characteristics combined with social networks-based approaches of the Internet could form a very powerful base to execute marketing strategies.

In general, mobile marketing and advertising can be divided into the following four categories: mobile marketing, mobile advertising, mobile direct marketing and mobile customer relation management (CRM). The present invention in any of its forms discussed above is applicable to all categories.

Mobile marketing is commonly considered as the systematic planning, implementing and control of a mix of business activities intended to bring together buyers and sellers for the mutually advantageous exchange or transfer of products or services where the primary point of contact with the consumer is via their mobile device.

Mobile advertising is commonly considered as the paid, public, non-personal announcement of a persuasive message by an identified sponsor as well as the non-personal presentation or promotion by a firm of its products to its existing customers and potential customers where such communication is delivered to a mobile telephone or other mobile device. Examples of mobile advertising include: Wireless Application Protocol (WAP) Banner ads, mobile search advertising, mobile video bumpers, and interstitial ads in or on device portals.

Mobile direct marketing is commonly considered a sales and promotion technique in which promotional materials are delivered individually to potential customers via the potential customer's mobile telephone or other mobile device. Examples of mobile direct marketing include the sending of Short Message Service (SMS), Multimedia Message Service (MMS) or Wireless Application Protocol (WAP) push messages, Bluetooth messaging and other marketing to mobile telephones or other mobile devices.

Mobile customer relation management is commonly considered as a combination of all the foregoing in a manner that establishes a long-term, engaging relationship between the customer and the marketing or promoting company.

At present, mobile marketing and advertising is mostly based on push campaigns to opt-in a consumer mobile number in a database, or pull campaigns that acquire mobile telephone numbers from consumers. The most typical example of the pull campaign is the "text-to-win" campaign where, e.g., a soft drink bottle contains a short code to be sent via text message to a certain telephone number. In return, the consumer receives a notification if they have won with the selected marketing message, or a series of messages is broadcast to their mobile telephone. Other popular methods of direct advertisement are achieved using text and video messaging.

Having described exemplary embodiments of the invention with reference to the accompanying drawings, it will be appreciated that the present invention is not limited to those embodiments, and that various changes and modifications can be effected therein by one of ordinary skill in the art without departing from the scope or spirit of the invention as defined by the appended claims. For example, while it is described that a mobile phone user will initiate a request for issuance of credits, it is foreseen that the initiation of requests can come from an advertiser or sponsor, wherein after receiving the request the system checks to determine if enough credits are present in a user's account to issue credits to the particular user.

The invention claimed is:

1. A system for issuing credits having monetary value to a mobile device using a communications network, comprising:
   a billing device configured to maintain an account of available credit for a user of the mobile device, and for generating an authorization to issue credit upon request if there is available credit in the account associated with the mobile device equal to or greater than the requested credit; and
   an issuer operatively coupled to the billing device and configured to receive authorization to issue credit from the billing device and issuing credits,
   wherein the user of the mobile device is notified via the communications network upon receiving notification of issuance of credit.

2. The system of claim 1, wherein the billing device comprises one of a billing system, a bank, or a credit card company.

3. The system of claim 1, wherein the billing device is arranged to at least one of maintain an account of pre-paid credit and an account of post-paid credit, and manage the account such that the account is reduced by each amount of authorized credit.

4. The system of claim 1, further comprising a wallet service server arranged to deliver credit to the mobile device, and receive a request from the mobile device for credit and notify the billing device of the request for credit such that the billing device can determine whether to generate an authorization to issue credit.

5. The system of claim 1, further comprising at least one mobile device selected from a group consisting of a mobile telephone, a multimedia computer, a personal digital assistant, a laptop computer and a personal computer.

6. The system of claim 1, further comprising at least one sponsor for providing credit.

7. The system of claim 6, wherein at least one of:
   the at least one sponsor is an advertiser which provides credit for the user of the mobile device in exchange for requiring the user to be exposed to an advertisement via their mobile device,
   the at least one sponsor is operatively coupled to the billing device and the billing device manages payments from each of the at least one sponsor for credits they have provided,
   the at least one sponsor is arranged to communicate with the issuer to enable the at least one sponsor to authorize issuance of credits to the user's mobile device, and
   the at least one sponsor is operatively coupled to the user's mobile device and receives requests for credit from the mobile device, the at least one sponsor being arranged to decide whether to provide credit to the requester's account at the billing device and if so, providing credit to the requester's account at the billing device.

8. The system of claim 7, wherein the at least one sponsor is arranged to receive the request for credit in association with an identification of an item sought to be purchased by the user of the mobile device using the credit.

9. The system of claim 8, wherein the item is identified using at least one of a bar code, key word, picture or link to a web site.

10. The system of claim 6, wherein the billing device is arranged to await approval from the at least one sponsor prior to generating the authorization to issue credit.

11. The system of claim 1, wherein the billing system is further configured to coordinate delivery of the credits, wherein the issuer is arranged to issue a code indicative of the issuance of a specific amount of credit which is delivered via the wallet service server to the mobile device, the code being usable by a point of sale terminal to communicate with the issuer in order to verify the amount of credit associated with the code.

12. A computer program resident on non-transient computer readable media and arranged to issue credits having monetary value to a mobile device using a communications network, the computer program being arranged to:
   maintain an account of available credit for a user of the mobile device;
   ascertain whether there is available credit in the account associated with the mobile device equal to or greater than a requested credit;
   generate an authorization to issue credit when there is available credit in the account; and
   issue credit in response to the authorization.

13. The computer program of claim 12, wherein the computer program is further arranged to at least one of:
   maintain at least one of an account of pre-paid credit,
   manage the account such that the account is reduced by each amount of authorized credit,
   enable at least one sponsor to provide available credit into the account,
   manage payments from each of the at least one sponsor for credits they have provided, and
   issue a code indicative of the issuance of a specific amount of credit and coordinate delivery of the code to the mobile device, the code being usable by a point of sale terminal in order to verify the amount of credit associated with the code.

14. A method for issuing credits having monetary value to a mobile device using a communications network, comprising:
   maintaining an account of available credit for a user of the mobile device;
   ascertaining whether there is available credit in the account associated with the mobile device equal to or greater than a requested credit;
   generating an authorization to issue credit when there is available credit in the account; and
   issuing credit in response to the authorization.

15. The method of claim 14, wherein the step of maintaining an account comprises maintaining at least one of an account of pre-paid credit and an account of post-paid credit.

16. The method of claim 14, further comprising at least one of:
   managing the account such that the account is reduced by each amount of authorized credit, enabling at least one sponsor to provide available credit into the account, and managing payments from each of the at least one sponsor for credits they have provided.

17. The method of claim 16, wherein the step of issuing credit comprises issuing credit in exchange for requiring the user to be exposed to at least one advertisement from the at least one sponsor, and wherein the step of receiving the request for credit comprises receiving the request at the at least one sponsor, the at least one sponsor deciding whether to provide credit to the requester's account and if so, providing credit to the requester's account.

18. The method of claim 17, further comprising delivering the request for credit to the at least one sponsor in association with an identification of an item sought to be purchased using the credit, and identifying the item using a bar code, key word, picture or link to a web site.

19. The method of claim 16, further comprising requiring approval from the at least one sponsor prior to generating the authorization to issue credit.

20. The method of claim 14, further comprising:

delivering at least one advertisement to the mobile device; and exposing the user of the mobile device to the at least one advertisement in exchange for issuance of credit, wherein the step of issuing credit comprises issuing a code indicative of the issuance of a specific amount of credit and delivering the code to the mobile device, the code being usable by a point of sale terminal in order to verify the amount of credit associated with the code.

21. The method of claim 20, further comprising:

generating the request for credit at the mobile device; and transmitting a request for credit via the communications network, wherein the request is received via a short message service, and wherein the request is received at a wallet service server and the account is maintained in a billing system, the step of ascertaining whether there is available credit in the account associated with the mobile device equal to or greater than the requested credit comprising directing a request from the wallet service center to the billing system to analyze the account, the authorization to issue credit when there is available credit in the account being made by the billing system.

22. A system for conducting a mobile advertising campaign in which credits having monetary value are issued to a mobile device using a communications network in exchange for exposure to at least one advertisement, comprising:

a billing device configured to maintain an account of available credit for the user of the mobile device, and to generate an authorization to issue credit upon request if there is available credit in the account associated with the mobile device equal to or greater than the requested credit;

a wallet service server configured to enable at least one advertiser to provide advertisements and credit into the account in the billing device; and an issuer operatively coupled to the billing device and configured to receive authorization to issue credit from the billing device and issuing credits, wherein the user of the mobile device is notified via the communications network upon receiving notification of issuance of credit, and wherein the mobile device being operatively arranged to require exposure to delivered advertisements in order to enable use of the credit.

23. The system of claim 22, wherein the billing device comprises at least one of a billing system, a bank, or a credit card company.

24. The system of claim 22, wherein the billing device is arranged to at least one of:

maintain at least one of an account of pre-paid credit and an account of post-paid credit, and manage the account such that the account is reduced by each amount of authorized credit.

25. The system of claim 22, wherein the wallet service server is further configured to deliver credit to the mobile device, wherein the wallet service server is configured to receive a request from the mobile device for credit and notify the billing device of the request for credit such that the billing device determines whether to generate an authorization to issue credit.

26. The system of claim 22, wherein each mobile device is selected from a group consisting of a mobile telephone, a multimedia computer, a personal digital assistant, a laptop computer and a personal computer.

27. The system of claim 22, wherein the at least one advertiser is coupled to the billing device and the billing device manages payments from each of the at least one advertiser for credits they have provided, wherein the at least one advertiser is arranged to communicate with the issuer to enable the at least one advertiser to authorize issuance of credits to the user's mobile device, and wherein the at least one advertiser is operatively coupled to the user's mobile device and receives requests for credit from the mobile device, the at least one advertiser being arranged to decide whether to provide credit to the requester's account at the delivery device and if so, providing credit to the requester's account at the delivery device.

28. The system of claim 22, wherein the issuer is arranged to issue a code indicative of the issuance of a specific amount of credit which is delivered via the wallet service server to the mobile device, the code being usable by a point of sale terminal to communicate with the issuer in order to verify the amount of credit associated with the code.

29. The system of claim 22, wherein the wallet service server is configured to provide data about the user of the mobile device to the at least one advertiser to enable the at least one advertiser to consider such data when deciding whether to provide credit to the user.

* * * * *